Figure 1:
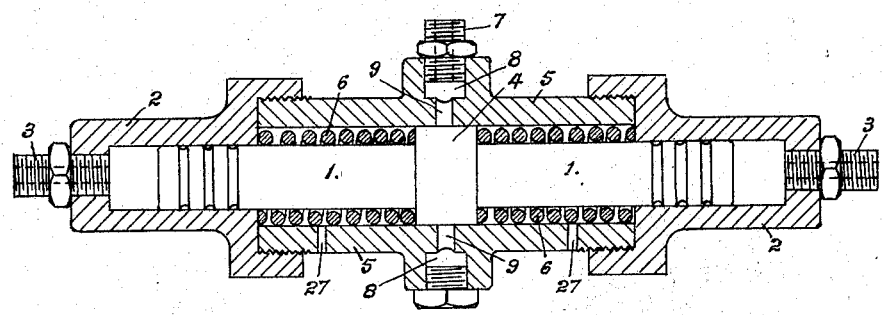

Feb. 11, 1930.   H. N. BARNES   1,746,628
GOVERNOR APPARATUS FOR CONTROLLING THE OPERATION OF ENGINES OR MACHINES
Filed April 11, 1927   2 Sheets-Sheet 1

Inventor
H. N. Barnes
By
Atty.

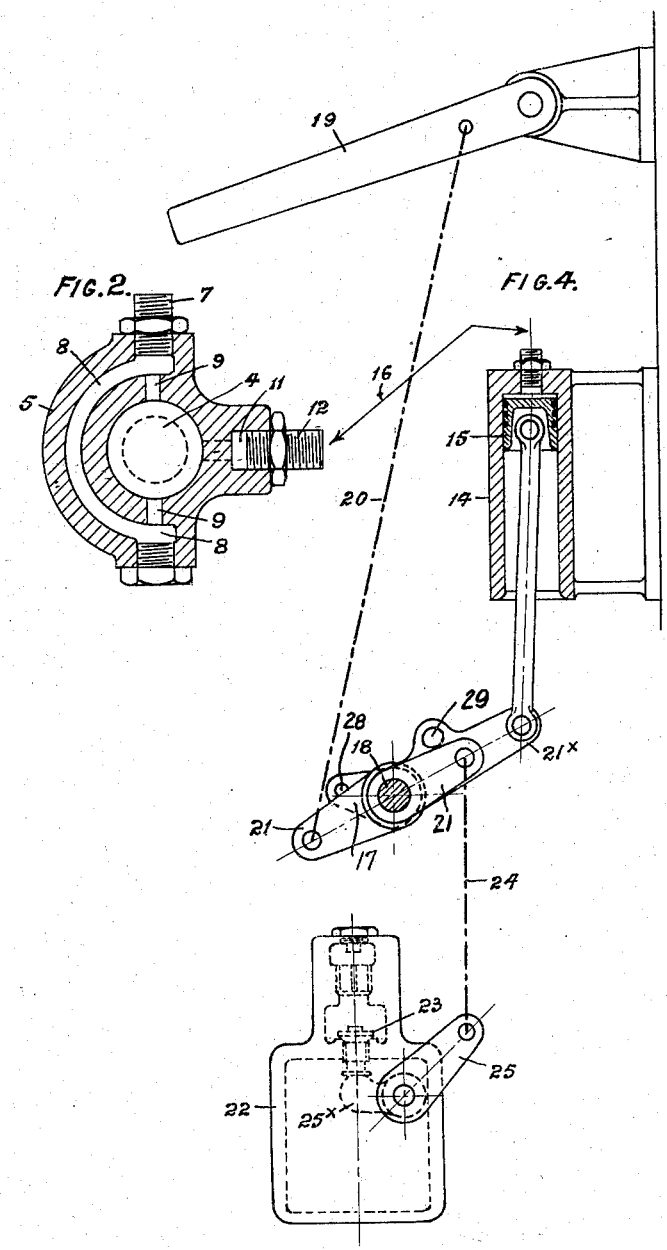

Patented Feb. 11, 1930

1,746,628

UNITED STATES PATENT OFFICE

HAROLD NOEL BARNES, OF ALLERTON, LIVERPOOL, ENGLAND

GOVERNOR APPARATUS FOR CONTROLLING THE OPERATION OF ENGINES OR MACHINES

Application filed April 11, 1927, Serial No. 182,870, and in Great Britain June 3, 1926.

This invention has reference to governor apparatus or systems for controlling the operation of engines or machines, and more particularly to engines or machines in connection with which a liquid, such as a lubricant for lubricating it is used under pressure in it, or a supply of water under pressure is used in connection with same, or both, such pressure liquid systems being advantageous or essential to the proper or normal working of the engines or machine, as for instance in internal combustion engines—more especially of the Diesel or similar types—in which liquid fuel is used, a system of lubricating is employed in which the lubrication is effected under an artificial head or pressure, and also a system of cooling cylinders and other parts of the engine by water under an artificial head or pressure is used and circulated; and this invention relates to governing systems in which this pressure of liquid such as referred to, is utilized for and applied to the governing of the engine through a piston or like device which is acted upon by such pressure; and when the pressure varies owing to break down or fault in the system, or other cause producing this variation, the piston or equivalent device is moved thereby, and this causes the governing of the engine to take place, and in some cases stopped.

According to this invention, a piston or diaphragm or like device which is actuated and controlled by the pressure of the liquid—such as the pressure of the lubricant within the engine, or in the case of an internal combustion the pressure of the cooling water—is used to control the supply and action of an external or separate source of power, for example compressed air or steam, which may exist in connection with the power plant, so that when the pressure of a fluid varies, i. e. the pressure of the lubricating fluid, or the cooling water, the compressed air or steam will be supplied to a part connected with the governor or governing means of the engine, such as a cylinder and piston, or a diaphragm device, which will be operated by it, and which is adapted to actuate a part which the governor proper of the engine is adapted to actuate when the governor acts; or in the case of a liquid fuel internal combustion engine, the liquid fuel being supplied to it by the oil feed pump, and stops the engine.

Afterwards, when the defect is remedied, the governor parts will move back to their normal position, when the supply of air or steam to the governor operating or controlling part, is again held off, and the engine can again work.

According to one method of operating, the part of the governor device moved by the air or other fluid under pressure supplied to such device, may consist of a piston and cylinder, or diaphragm device or the like, which may be adapted to actuate the oil fuel suction or inlet valves of the engine (when applied to such an engine), so that these valves will be held off their seats, and thereby no liquid fuel will be supplied to the engine by the supply pumps.

In another case this air or fluid actuated device or means may act in connection with the governor proper of the engine, used to regulate its speed or movement, such as the lever which is used in connection with, and is acted upon by the "Aspinall" type of governor, and which when so operated, will shut off the supply of fuel to the engine, it being adapted to do this.

In another case or modification, this air or fluid pressure actuated device may act both directly upon the oil fuel valves as above described, and also the engine governor moved part, or some other suitable part as the case may be.

While the invention has been described as applied primarily to the governing of liquid fuel internal combustion engines, the operation of which is dependent upon the proper and normal condition of its pressure lubricating system, and its proper and normal cooling by the cooling water pressure system, it may also be employed in connection with any other machines or other types of engines, such as those where high temperature working fluids are used or exist, and artificial pressure circulating lubricating systems, and artificial pressure water cooling systems are used or necessary, or either of them.

In the system in which an Aspinall type of inertia governor is used for controlling the velocity or speed of an engine such as a marine engine, and also to cut off the supply of fuel in case of a break down, or broken propeller shaft, or from abnormal speed taking place, the piston and cylinder or like device which is actuated by the said air or other fluid under pressure may be connected to a shaft by a lever carrying an arm or lever on the engine, and which is actuated by the Aspinall governor; and this mechanism may have a lever or arm, say on the said shaft, which actuates in a suitable way through suitable mechanism, the fuel inlet or suction valves for the engine; and when in action these valves will be held off their seats as stated, so that no oil fuel will be supplied to the cylinders of the engine by the pumps in this condition.

The governor apparatus having the characteristics above described is illustrated in the annexed drawings, in connection with which it will be further described.

Figure 3:
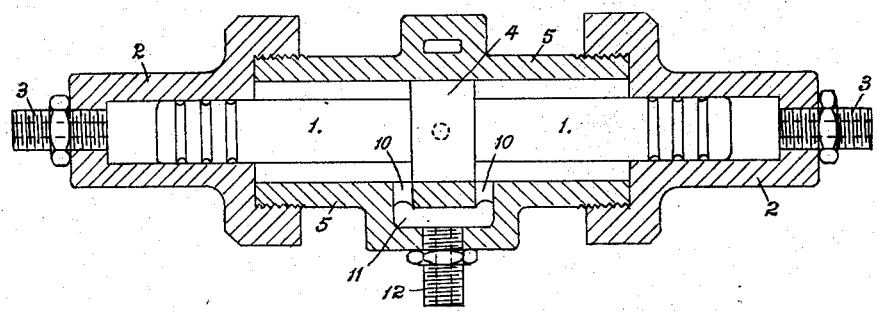

In these drawings, Figure 1 is a longitudinal section; Figure 2 is a cross section of the pressure governing device; and Figure 3 is a plan in section showing a part of the apparatus at the centre or central port arrangement, through which air or other fluid under pressure is delivered by the apparatus in the governing action, and also the parts connected with the engine which is actuated by this air or pressure fluid. Figure 4 shows the parts operated by the apparatus shown in Figures 1 to 3.

The form of apparatus shown in the drawings is one in which both the oil of the lubricating system, under an artificial head, and the water of the water cooling system under an artificial head, are utilized; and the apparatus takes the form of two connected rams 1, working in cylinders 2, one connected by the inlet nozzle 3 with the cooling water circulating system of an engine, and the other nozzle 3 with the oil lubricating system; and assuming that both these liquid works under an equal pressure, and the rams 1 are of equal diameter, the pressure on the ends of the rams will be equal and opposite.

The rams 1 have at their centre part an enlarged cylindrical part 4, which acts as a piston valve, and works in a correspondingly enlarged cylinder 5 extending between the ends of the cylinders 2; and within the annular spaces between the rams 1 and the cylinder 5, are spiral springs 6, which rest at one end on the end of the cylinder 5, and act in opposite directions on the opposite sides of the piston valve 4.

The valve 4 acts in connection with a port arrangement on the cylinder 5, which is shown clearly in the drawing; and into this port arrangement, the air or other fluid used to operate the governor parts, is supplied through the inlet conduit 7.

In ships driven by oil fuel engines, it is usual to use compressed air to operate their whistles or sound signals, and it may be assumed, that this compressed air, from any suitable source, is used to operate the governor apparatus.

The port arrangement comprises a port 8 in the form of a belt leading to the opposite sides of the cylinder 5; and ports 9 in the central portion of the cylinder 5 around which the belt port extends, such ports being normally closed by the piston valve 4; and the pressure air having access by the parts 9 to the surface of the piston valve and being opposite to each other, the pressure on it will be equal and opposite, so that it is an equilibrium, and so its accurate action is not interfered with by the pressure upon it.

Further, in the cylinder 5, and on each side of the piston valve 4, are ports 10 leading into a common chamber 11, having a branch or nipple 12, which is connected by a pipe with the governor part which is to be actuated by the compressed air supplied from this apparatus shown and above described.

In the operation of the compressed air supply and distribution part of the apparatus, in the event of a variation of the pressure of the oil lubricating system, or the cooling water circulating system, and the equal pressure in the cylinder 2 becoming upset, then the rams 1 and the valve 4 will be moved one way or the other by the pressure in the cylinder 2 which is for the time being, the greater, and the piston valve 4 will be moved so as to uncover the ports 9, and thereby compressed air can pass into the cylinder 5, and so through one of the ports 10 into the common chamber 11, and so by the pipe 16, connecting this chamber with the engine governor operative part, to the latter, so that the governor mechanism will be actuated and the engine stopped.

The governing apparatus, connected with the engine shown in the drawing, consists of a cylinder 14 and piston 15, the cylinder being connected with the chamber 11 by the pipe 16; and in this case, the piston 15 is connected with a lever 21$^x$ on the shaft 18, which may be a shaft on the engine; and this shaft may be assumed to be that which is used and worked in cases where the governor is of the well-known "Aspinall" type, and of which 19 is the usual lever which is operated by this governor, and which through a connection rod 20 and lever 21 on the shaft 18, causes the supply of fuel to the engines to be cut off or reduced. Namely, on the shaft 18 there is another arm or lever 17 which is connected by a connecting rod 24 with a lever 25 mounted on a spindle on the valve casing 22, within which the fuel pump inlet or suction valve 23—and delivery valve also—are contained, and within which casing is an arm 25ˣ on the spindle of the lever 25, which is adapted to move the valve 23 off its seat, and hold it there, when the Aspinall governor apparatus comes into action.

When using this governor cylinder 14 and piston 15 in conjunction with an Aspinall type of governor, as stated, an extra lever 17 is fixed on the shaft 18; and in many cases the lever 25 of the fuel suction or inlet valve 23 of the fuel pump is connected to the lever 21ˣˣ, which is also fixed on the shaft 18, while the lever 21 which is connected by the rod 20 to the lever 19, is loosely mounted on the shaft 18, and the lever 21ˣ is also loosely mounted on the shaft 18. But in the case of the application of the Aspinall governor in connection with the governing system herein described, the Aspinall governor is adapted to be free to act on the fuel valves independently of the cylinder and piston 14, 15; and this cylinder piston must be free to act in connection with the lever 25 and valve 23 independently of the governor lever 19. This may be accomplished by the lever 21 being mounted loosely on the shaft 18, and the lever 17 fixed on this shaft; and the latter lever being adapted to project beyond the shaft 18, and provided with a projection 28 on it, which comes on the upper side of the lever 21; and also providing another projection or pin 29 on the loose lever 21ˣ, which normally lies above the fixed lever 21ˣˣ, so that the Aspinall governor actuated lever 19 is free to be operated by the Aspinall governor when it comes into action, and when so actuated, does not act upon the cylinder and piston arrangement 14, 15; while the cylinder and piston can act on the lever 21ˣ, and the valve 22 through the projection 29 and fixed lever 17 without affecting the Aspinall lever 19.

When the Aspinall lever 19 and lever 21 are moved up the fixed lever 17 is passed and so the fixed lever 21ˣˣ is depressed and thus the valve 22 is opened.

It would be of course understood that when the invention is applied to the governing of engines on land, in cases where a governor of the Aspinall type is not required, the portion of this governor gear herein described, concerned with the governing effected by this type of governor may be omitted.

In the cylinder 5 on each side of the ports 9, a small hole 27 is provided in the cylinder wall, so that any liquid which passes the operating rams or pistons 1, and arrives in the cylinder 5, can leak off; but these holes are of such smallness, that in the event of the governing apparatus coming into operation, they will not materially affect the supply of air or fluid from the cylinder 5 to the cylinder and piston 14, 15. In some cases these holes 27 may be provided with small whistles or sound producing devices, so that they will serve to indicate orally to the engineer or other, the cause of the main engines stopping.

A shut off cock may be provided on the pipe or nipple 7 for conveying air or liquid under pressure to the apparatus, so that it can be shut off by hand after the governor apparatus has operated; while the leak off holes 27 allow the remaining air in the cylinder to escape, so that the springs 6 bring the piston valve 4 back to the mid or normal position.

A suitable small safety valve may be used on the cylinder 14, so that if any pressure takes place in the cylinder above that supplied to the cylinder 5 by the compressed air or other pressure service, it can escape if it be compressed in the cylinder 15 by the upward movement of the piston 14 by the mechanism, as when the Aspinall governor lever comes into action.

What is claimed is:—

1. In an automatic control means for internal combustion engines having water cooling means under pressure, an engine governor adapted to be operated by fluid pressure, and a valve normally cutting off said fluid pressure to the governor, said valve being open to counterbalancing effects of which one is the cooling water under pressure, with said counterbalancing effects holding the valve in normal position, whereby on reduction in pressure of the cooling water the valve is operated to admit fluid pressure to the governor.

2. In an apparatus for governing internal combustion engines having a cooling water supply under pressure and a source of lubrication under pressure, a governor for the engine adapted to be actuated by fluid pressure, a valve normally closing the governor against such fluid pressure, and means including the cooling water under pressure and the lubricant under pressure for balancing said valve in normal position.

3. A governing means for internal combustion engines having cooling water under pressure and lubricant under pressure, comprising a valve controlling engine operation, a cylinder in which the valve is operative, and means whereby the valve is held against movement by the opposing pressures of the cooling water and of the lubricant, said means permitting the valve to move for engine control in response to pressure reduction in either the cooling water or lubricant.

4. A governor for internal combustion engines including a cylinder, a passage therethrough for a fluid under pressure to be utilized in engine control, a valve in the cylinder normally closing said passage, rams bearing on the respective sides of the valve, and means whereby the rams are subjected respectively to the cooling water under pressure and to the lubricant under pressure.

In testimony whereof I have signed my name to this specification.

H. N. BARNES.